US009236977B2

(12) United States Patent
Luo et al.

(10) Patent No.: US 9,236,977 B2
(45) Date of Patent: Jan. 12, 2016

(54) METHOD AND APPARATUS FOR PUCCH AND PUSCH ENCODING

(75) Inventors: Xiliang Luo, Cardiff, CA (US); Juan Montojo, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 13/251,943

(22) Filed: Oct. 3, 2011

(65) Prior Publication Data

US 2012/0082075 A1 Apr. 5, 2012

Related U.S. Application Data

(60) Provisional application No. 61/389,560, filed on Oct. 4, 2010, provisional application No. 61/442,702, filed on Feb. 14, 2011.

(51) Int. Cl.
*H04L 1/16* (2006.01)
*H04L 1/00* (2006.01)
*H04L 1/18* (2006.01)

(52) U.S. Cl.
CPC ............ *H04L 1/0057* (2013.01); *H04L 1/0071* (2013.01); *H04L 1/1607* (2013.01); *H04L 1/1829* (2013.01)

(58) Field of Classification Search
CPC ... H04L 1/0057; H04L 1/0067; H04L 1/0071; H04L 1/1607; H04L 1/1829
USPC ........................................................ 370/310
See application file for complete search history.

(56) References Cited

U.S. PATENT DOCUMENTS

| | | | |
|---|---|---|---|
| 2002/0136317 A1* | 9/2002 | Oelcer et al. | 375/261 |
| 2004/0100918 A1 | 5/2004 | Toskala et al. | |
| 2007/0286124 A1* | 12/2007 | Grant et al. | 370/331 |
| 2008/0090528 A1* | 4/2008 | Malladi | 455/70 |

(Continued)

FOREIGN PATENT DOCUMENTS

| | | |
|---|---|---|
| CN | 1893342 A | 1/2007 |
| CN | 101578797 A | 11/2009 |

(Continued)

OTHER PUBLICATIONS

Ericsson, "A/N transmission in the uplink for carrier aggregation", Feb. 22-26, 2010, 3GPP TSG-RAN WG1 #60, R1-100909, San Francisco, 4 pages.*

(Continued)

*Primary Examiner* — Dustin Nguyen
*Assistant Examiner* — Amy Ling
(74) *Attorney, Agent, or Firm* — Norton Rose Fulbright US LLP

(57) ABSTRACT

Wireless uplink communication is disclosed which includes dividing information bits into first and second sets of information bits. The first set of information bits is encoded into a first set of coded bits, while the second set of information bits is encoded into a second set of coded bits. The first and second sets of coded bits are rate matched into a defined number of bits generating first and second sets of rate-matched coded bits. The first and second sets of rate-matched coded bits are interleaved using various interleaving methods to generate an interleaved set of coded bits.

30 Claims, 6 Drawing Sheets

(56) References Cited

U.S. PATENT DOCUMENTS

| | | | |
|---|---|---|---|
| 2008/0101264 A1* | 5/2008 | Li et al. | 370/310 |
| 2008/0137570 A1* | 6/2008 | Min et al. | 370/310 |
| 2008/0165873 A1 | 7/2008 | Ghosh et al. | |
| 2008/0301536 A1 | 12/2008 | Shin et al. | |
| 2008/0317152 A1 | 12/2008 | Sun et al. | |
| 2009/0296644 A1* | 12/2009 | Cheon | H04L 1/0072 370/329 |
| 2009/0296850 A1 | 12/2009 | Xu et al. | |
| 2010/0135181 A1 | 6/2010 | Earnshaw et al. | |
| 2010/0172433 A1 | 7/2010 | Li et al. | |
| 2010/0195575 A1* | 8/2010 | Papasakellariou et al. | 370/328 |
| 2011/0228863 A1* | 9/2011 | Papasakellariou et al. | 375/259 |
| 2011/0235619 A1* | 9/2011 | Chong et al. | 370/335 |
| 2011/0243066 A1* | 10/2011 | Nayeb et al. | 370/328 |
| 2011/0310853 A1* | 12/2011 | Yin | H04L 1/0009 370/335 |
| 2012/0051245 A1* | 3/2012 | Nam et al. | 370/252 |
| 2012/0082157 A1* | 4/2012 | Yamada et al. | 370/389 |
| 2012/0084620 A1* | 4/2012 | Miyazaki | 714/752 |
| 2012/0320852 A1* | 12/2012 | Seo et al. | 370/329 |
| 2012/0320951 A1* | 12/2012 | Han | H04L 1/0041 375/141 |
| 2013/0094524 A1* | 4/2013 | Harrsion et al. | 370/537 |

FOREIGN PATENT DOCUMENTS

| | | |
|---|---|---|
| EP | 1903735 A1 | 3/2008 |
| EP | 2129030 A1 | 12/2009 |
| JP | 2008547332 A | 12/2008 |

OTHER PUBLICATIONS

3GPP TS 36.212 V9.3.0 (Sep. 2010); Evolved Universal Terrestrial Radio Access (E-UTRA); Multiplexing and channel coding (Release 9); 3GPP; 62 pages.*

Qualcomm Europe, "Multiplexing of SR and ACK/NAK transmission on PUCCH", Feb. 15, 2008, 3GPP TSG-RAN WG1 #52, RA-080964, 3 pages.*

Qualcomm Europe, "Interleaver for PUCCH", Mar. 31, 2008, 3GPP TSG-RAN WG1, #52bis, R1-081501, 7 pages.*

Huawei et al: "A/N coding schemes for large payload using DFT-S-OFDM", 3GPP Draft; R1-105247, 3rd Generation Partnership Project (3GPP), Mobile Competence Centre ; 650, Route Des Lucioles ; F-06921 Sophia-Antipolis Cedex ; France, vol. RAN WG1, No. Xi'an; Oct. 11, 2010, Oct. 5, 2010, XP050450431, [ retrieved on Oct. 5, 2010].

International Search Report and Written Opinion—PCT/US2011/054679—ISA/EPO—Dec. 2, 2011.

Nokia et al: "UL ACK/NAK Payload Size in LTE-A TDD", 3GPP Draft; R1-105521 UL an Payload in LTE-A TDD, 3rd Generation Partnership Project (3GPP), Mobile Competence Centre ; 650, Route Des Lucioles ; F-06921 Sophia- Antipolis Cedex ; France, vol . RAN WG1, No. Xi'an; Oct. 11, 2010, Oct. 5, 2010, XP050450724, [retrieved on Oct. 5, 2010].

* cited by examiner

METHOD AND APPARATUS FOR PUCCH AND PUSCH ENCODING

REFERENCE TO RELATED APPLICATIONS

This application claims the benefit of U.S. Provisional Patent Application No. 61/389,560 entitled, "METHOD AND APPARATUS FOR PUCCH ENCODING," filed on Oct. 4, 2010, and claims the benefit of U.S. Provisional Patent Application No. 61/442,702 entitled, "METHOD AND APPARATUS FOR PUCCH AND PUSCH ENCODING," filed on Feb. 14, 2011, which are hereby incorporated by reference.

BACKGROUND

I. Field

The present disclosure relates generally to communication, and more specifically to techniques for Physical Uplink Control Channel (PUCCH) and Physical Uplink Shared Channel (PUSCH) encoding in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A base station may include multiple transmit and/or receive antennas. Each UE may include multiple transmit and/or receive antennas. The UE transmits various control information over the PUCCH and PUSCH. In LTE-A, a new format, PUCCH format 3 is introduced for carrier aggregation. PUCCH format 3 transmits a discrete Fourier transform single-carrier orthogonal frequency division multiplexing (DFT-S-OFDM) waveform in each SC-FDM symbol. The PUCCH format 3 can carry 48 coded bits with QPSK modulation. However, encoding the control information bits corresponding to format 3 has not yet been established.

Further, control information may be transmitted in the PUSCH. Different coding rates for the control information may be achieved by allocating different number of coded symbols for its transmission. For example, when control information are transmitted in the PUSCH, the channel coding for HARQ-ACK, rank indicator (RI) and channel quality information (CQI) may be done independently. However, channel coding for more than 11 bits of HARQ-ACK information has not yet been established.

SUMMARY

Information bits, beyond the 11 bits of the prior art, may be encoded on an uplink physical channel. The information bits may include uplink control information to be conveyed on the physical uplink shared channel (PUSCH) or the physical uplink control channel (PUCCH). The information bits may be divided into two sets, and each of the two sets block encoded and rate-matched. After rate-matching, the two sets of bits may be interleaved to obtain slot diversity.

In one exemplary aspect, a method for wireless communication includes dividing information bits into first and second sets of information bits, encoding the first set of information bits into a first set of coded bits, encoding the second set of information bits into a second set of coded bits. The method also includes rate matching the first and second sets of coded bits into a defined number of bits to generate a first set of rate-matched coded bits and a second set of rate-matched coded bits. The method also includes interleaving the first and second sets of rate-matched coded bits to generate an interleaved set of coded bits.

In another exemplary aspect, a computer program product includes a non-transitory computer-readable storage medium with program code recorded thereon. The program code including code to divide information bits into first and second sets of information bits, code to encode the first set of information bits into a first set of coded bits, code to encode the second set of information bits into a second set of coded bits, code to rate match the first and second sets of coded bits into a determined number of bits, and code to interleave the first and second set of coded bits to generate an interleaved set of coded bits.

In another exemplary aspect, an apparatus configured for wireless communication includes at least one processor coupled to a memory. The processor is configured to divide information bits into first and second sets of information bits, to encode the first set of information bits into a first set of coded bits, to encode the second set of information bits into a second set of coded bits, to rate match the first and second sets of coded bits to a determined number of bits, and to interleave the first and second sets of coded bits to generate an interleaved set of coded bits.

In another exemplary aspect, an apparatus for wireless communication includes means for dividing information bits into first and second sets of information bits and a second set of information bits, means for encoding the first set of information bits into a first set of coded bits, means for encoding the second set of information bits into a second set of coded bits, means for rate matching the first and second sets of coded bits into a defined number of bits to generate a first set of rate-matched coded bits and a second set of rate-matched coded bits, and means for interleaving the first and second sets of rate-matched coded bits to generate an interleaved set of coded bits.

Various aspects and features of the disclosure are described in further detail below.

DETAILED DESCRIPTION

As discussed in details below, various encoding options are disclosed for uplink control information. The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
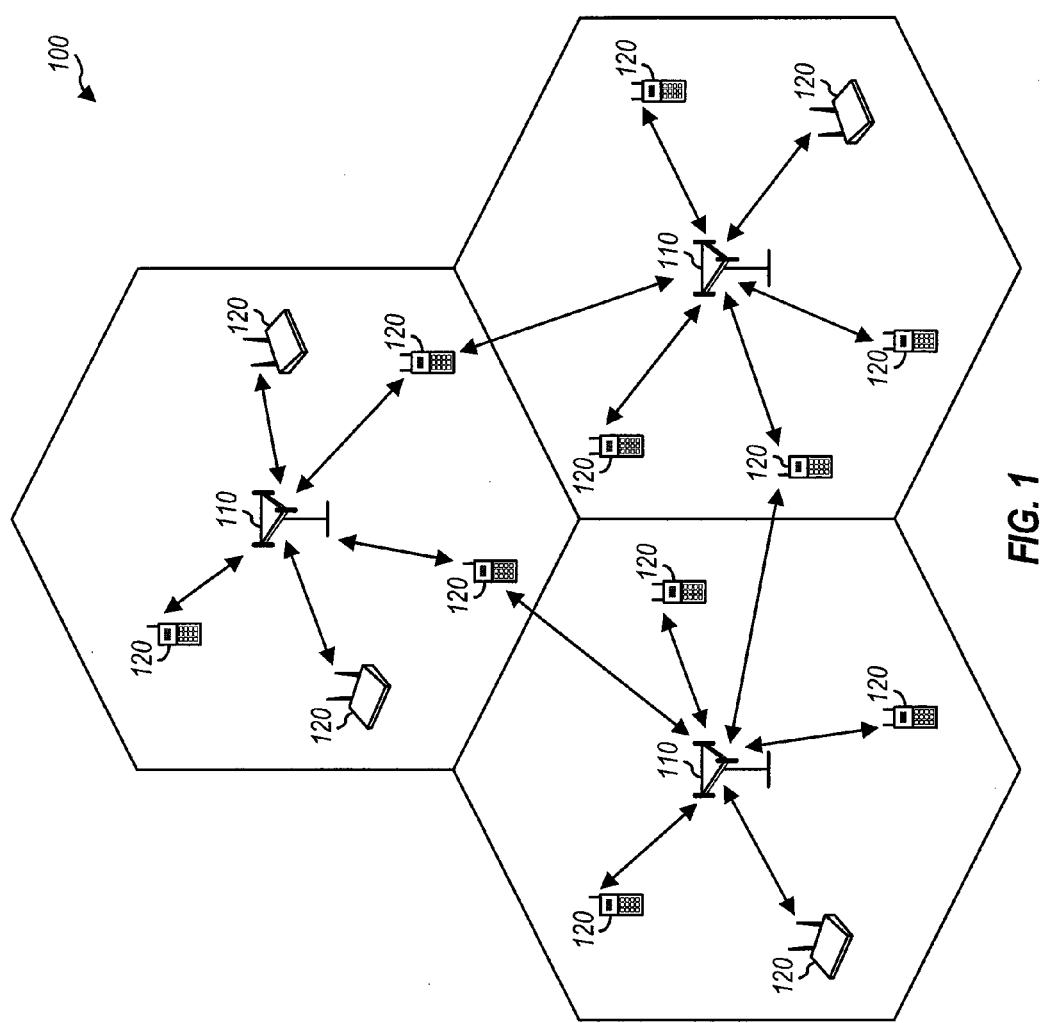
FIG. 1 is a block diagram conceptually illustrating an example wireless communication system.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB 110 and/or an eNB subsystem serving this coverage area.

UEs 120 may be dispersed throughout the system, and each UE 120 may be stationary or mobile. A UE may also be referred to as a mobile station, a terminal, an access terminal, a subscriber unit, a station, etc. A UE 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($K_s$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($K_s$) may be dependent on the system bandwidth. For example, $K_s$ may be equal to 128, 256, 512, 1024 or 2048 for system bandwidth of 1.25, 2.5, 5, 10 or 20 mega-Hertz (MHz), respectively. The system bandwidth may correspond to a subset of the $K_s$ total subcarriers.

Figure 2:
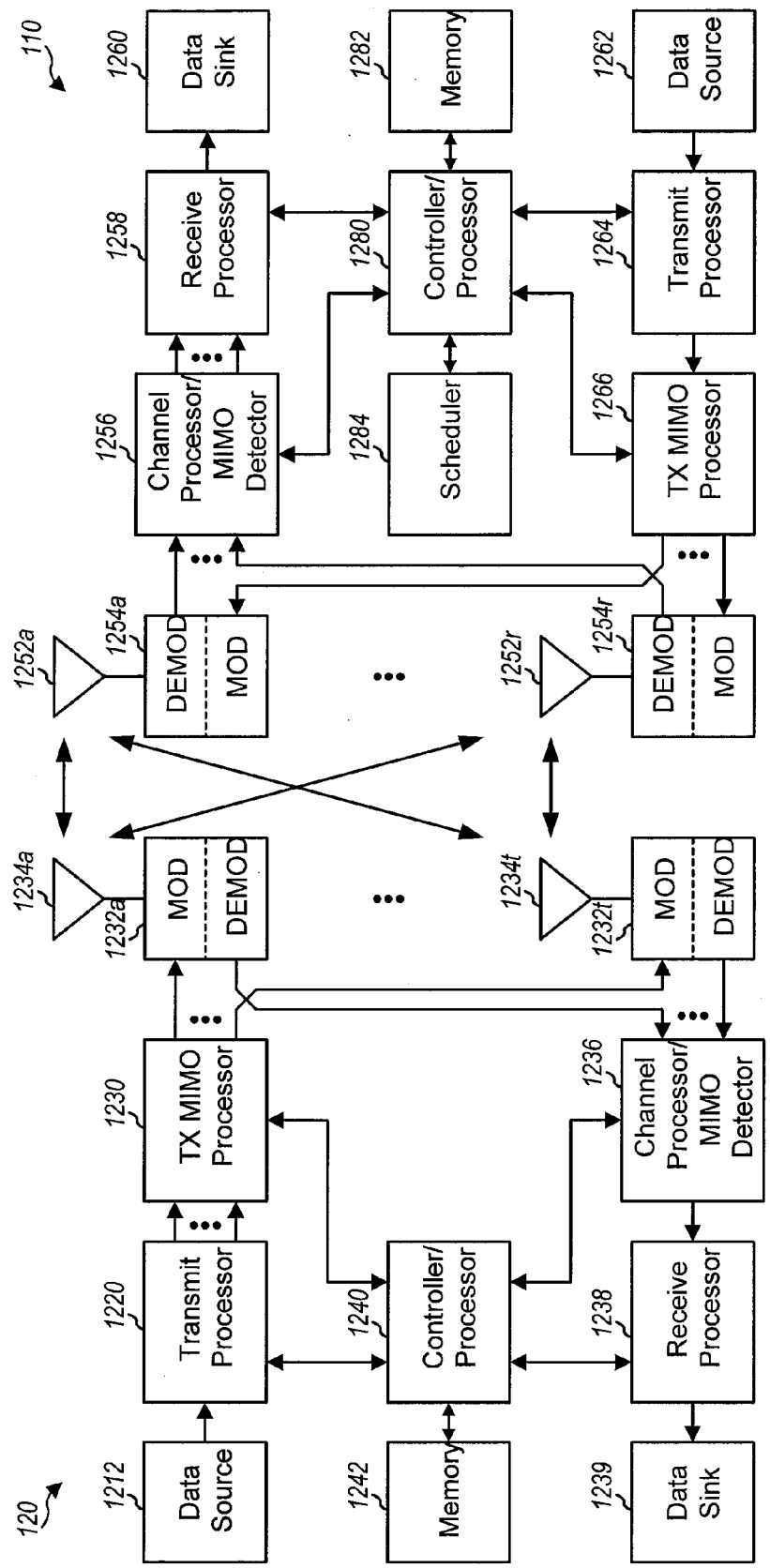
FIG. 2 is a diagram conceptually illustrating an exemplary transmission structure.

FIG. 2 shows a block diagram of a design of an exemplary base station/eNB 110 and a UE 120, which may be one of the eNBs and one of the UEs in FIG. 1. A UE 120 may be equipped with T antennas 1234a through 1234t, and base station 110 may be equipped with R antennas 1252a through 1252r, where in general T≥1 and R≥1.

At UE 120, a transmit processor 1220 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals for multiple non-contiguous clusters based on one or more RS sequences assigned to UE 120 and may provide reference symbols. A transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232a through 1232t. Each modulator 1232 may process a respective output symbol stream (e.g., for SC-FDMA, OFDM, etc.) to obtain an output sample stream. Each modulator 1232 may further process (e.g., convert to analog, amplify, filter, and upconvert) the output sample stream to obtain an uplink signal. T uplink signals from modulators 1232a through 1232t may be transmitted via T antennas 1234a through 1234t, respectively.

At base station 110, antennas 1252a through 1252r may receive the uplink signals from UE 120 and provide received signals to demodulators (DEMODs) 1254a through 1254r, respectively. Each demodulator 1254 may condition (e.g., filter, amplify, downconvert, and digitize) a respective received signal to obtain received samples. Each demodulator 1254 may further process the received samples to obtain received symbols. A channel processor/MIMO detector 1256 may obtain received symbols from all R demodulators 1254a through 1254r. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, at base station 110, data from a data source 1262 and control information from controller/processor 1280 may be processed by a transmit processor 1264, precoded by a TX MIMO processor 1266 if applicable, conditioned by modulators 1254a through 1254r, and transmitted to UE 120. At UE 120, the downlink signals from base station 110 may be received by antennas 1234, conditioned by demodulators 1232, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may perform or direct process for the techniques described herein. Memories 1242 and 1282 may store data and program codes for UE 120 and base station 110, respectively.

Encoding options for uplink control information conveyed in the PUCCH and uplink control information conveyed in the PUSCH are provided in LTE. In LTE Rel-8 and 9, PUCCH format 1 and format 2 are supported. For example, PUCCH Format 1 may be used for scheduling request. PUCCH Format 1a/1b may be used for 1 or 2-bit ACK/NACK. Also, PUCCH Format 2/2a/2b may be used for CQI with/without ACK/NACK. The messages on the PUCCH may be modulated on a cyclic shift of a sequence in each SC-FDM symbol.

In LTE Rel-10, a new format, called PUCCH Format 3 (also called DFT-S-OFDM format) is introduced for carrier aggregation. Format 3 transmissions include a DFT-S-OFDM waveform in each SC-DFM symbol. In one design, PUCCH Format 3 uses length-5 orthogonal cover codes (OCC) across data SC-FDM symbols in each time slot. In another design, PUCCH Format 3 uses length-4 OCC across data SC-FDM symbols in the second time slot. Further, PUCCH Format 3 can carry 48 coded bits with QPSK modulation scheme. Thus, 24 coded bits can be sent in each time slot. Although transmission of data for the PUCCH is described below, the method described below may also apply to transmission of data in other channels, such as the PUSCH.

Figure 3:
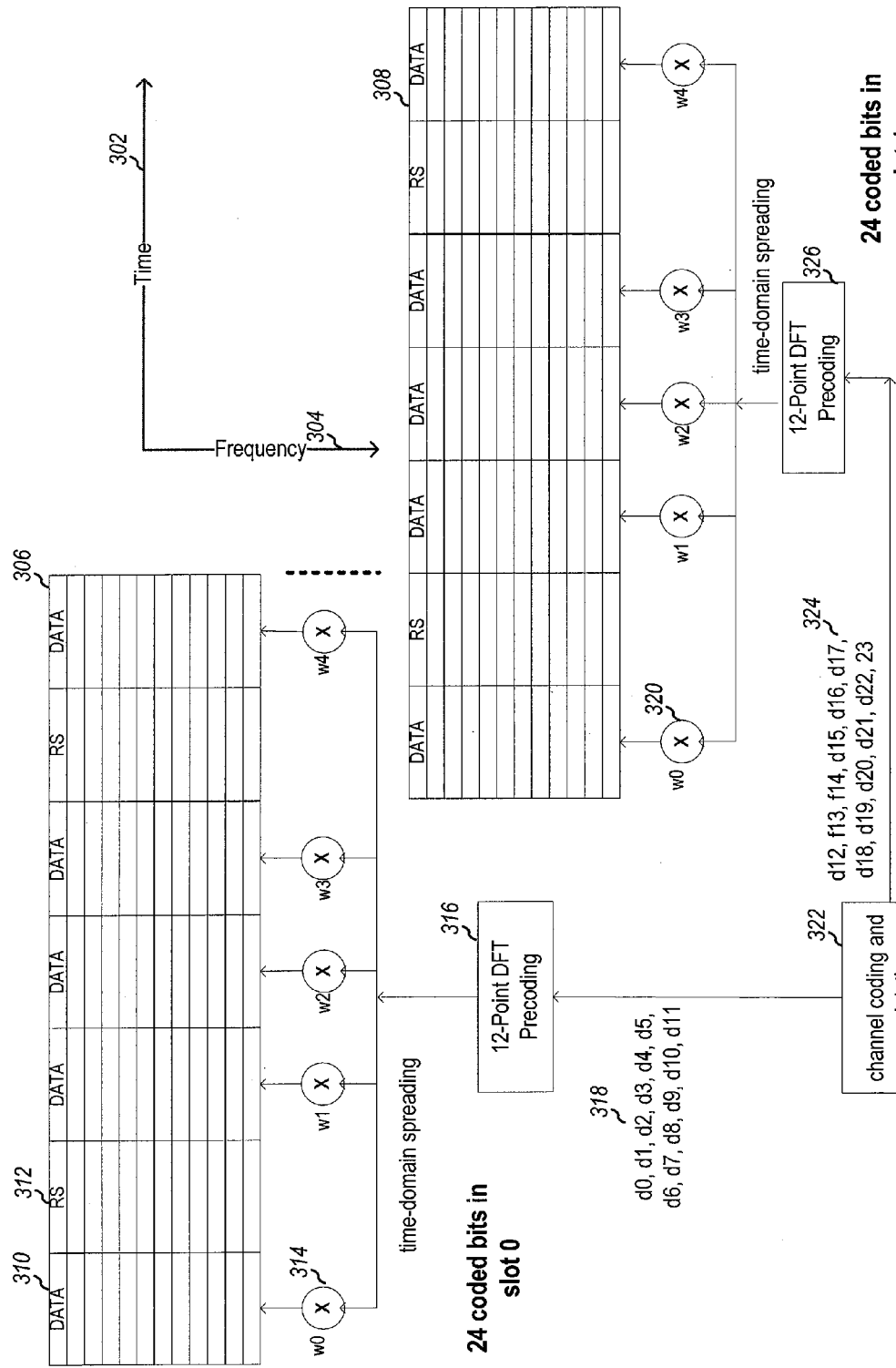
FIG. 3 is a diagram conceptually illustrating an example of a transmission of uplink control information in a wireless communication system.

FIG. 3 depicts an example transmission of a DFT-S-OFDM waveform in each SC-FDM symbol, using PUCCH format 3. Time is plotted in the horizontal direction (axis 302) and frequency resources are plotted in the vertical direction (axis 304). PUCCH signals transmitted in two time slots 306 and 308 of a subframe are shown. Each time slot 306, 308 includes symbols allocated to data (e.g., symbol 310) and reference signal RS (e.g., symbol 312). The RS may be referred to as demodulation reference signal. Information bits, such as ACK/NACK bits, may be processed through a channel coding and modulation block 322 to generate a first set of modulation symbols 318 and a second set of modulation symbols 324. The modulation symbols 318 and 324 may be precoded through discrete Fourier transform (DFT) precoding modules 316 and 326, respectively.

The resulting output of the DFT precoding may be spread in time domain using weights $w_0$ to $w_4$. Weights $w_0$ to $w_4$ (reference numbers 314, 320) represent coefficients of an orthogonal cover code (OCC). The weights $w_0$ to $w_4$ may, for example, represent one column of a 5×5 discrete Fourier transform (DFT) matrix. The output may then be mapped to different symbols. According to one aspect, the RS symbols may be modulated on a cyclic shift (not shown in FIG. 3). 24 coded bits can be sent in time slot 306, and 24 coded bits can be sent in time slot $30_8$. The 48 coded bits may be modulated with QPSK.

When information to be encoded is between 1 and 11 bits, a (32, O) block encoder, as defined in Rel-8, may be applied to the information bits, where O is the number of input bits to the encoder. However, when information to be encoded is 12 or more bits additional processing may be performed.

According to one aspect, tail-biting convolutional coding (TBCC) may be performed on the information bits. Slot-boundary frequency hopping may be performed on the encoded information bits to improve diversity.

According to a second aspect, a (48, O) block encoder may be applied to the information bits, where O is the number of input bits to the encoder. Slot-boundary frequency hopping may be performed on the encoded information bits to improve diversity.

According to a third aspect, two (32, O) block encoders may be applied to the information bits after dividing the information bits into a first set of information bits and a second set of information bits. Each of the block encoders then receives either the first set of bits or the second set of bits and generates a first set of encoded bits and a second set of encoded bits, respectively. The resulting first and second set of encoded bits may be rate matched and transmitted. The rate matching may rate match the encoded bits to a defined size. For example, each of the first set of encoded bits and the second set of encoded bits may be rate matched to 24 bits to generate a total of 48 bits. The first set of encoded bits and the second set of encoded bits may be transmitted in separate time slots.

According to a fourth aspect, interleaving may be applied to the third aspect to provide diversity in transmission of the encoded bits. For example, a plurality of information bits may be divided into a first set of information bits and a second set of information bits. The first and second set of information bits may be encoded, such as with one or more block encoders, to form a first and second set of coded bits. When two block encoders are present, the number of input bits to (32, O) encoders may be the same or different. For example, for 12 bits, 6 bits may be encoded by each encoder. For 13 bits, 7 bits may be encoded by the first encoder and 6 bits may be encoded by the second encoder.

The first and second set of encoded bits may then be rate matched to a defined number of bits. For example, the number of bits may be selected as 48 bits when the encoded bits are for transmission on the PUCCH format 3. In another example, the number of bits may be selected based on the number of resource blocks assigned to the mobile station when the encoded bits are for transmission on the PUSCH.

After the first and second sets of coded bits are rate matched, the first and second sets of coded bits may be interleaved to generate a third set of coded bits for transmission. Interleaving may be either bit-level interleaving or symbol-level interleaving, and the bits may be interleaved into time slots in a pseudo-random or even/odd manner. That is, when coded bits are selected for interleaving, bits from the first and the second set of coded bits may be chosen randomly for inclusion in a first time slot or a second time slot. Alternatively, the coded bits may be selected for the first and second time slots by alternating bits between the first set and the second set of coded bits: even bits of the first set may be placed in the first time slot and odd bits of the first set may be placed in the second time slot, while even bits of the second set may be placed in the first time slot and odd bits of the second set may be placed in the second time slot. Interleaving may also include concatenating the first and second set of coded bits.

Determination of an interleaving method for application to the first and second sets of coded bits may be based, in part, on the channel for transmission. For example, when the first and second sets of coded bits are for transmission on the PUSCH, then concatenation may be applied to interleave the first and second set of coded bits. In another example, when the first and second sets of coded bits are for transmission on the PUCCH, then even/odd interleaving may be applied to interleave the first and second set of coded bits. After generating the third set of coded bits by interleaving the first and second coded bits, the third set of coded bits may be transmitted. The third set of coded bits may be transmitted in a first time slot and a second time slot of a subframe according to the interleaving.

Figure 4:
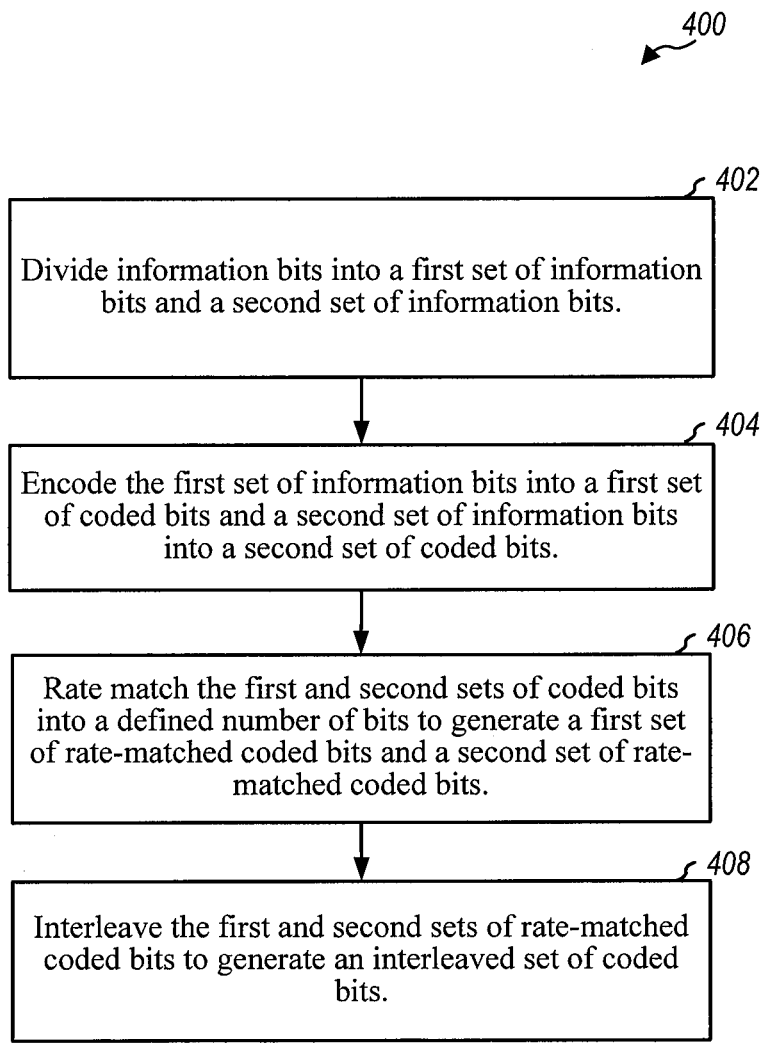
FIG. 4 is a functional block diagram conceptually illustrating example blocks executed to implement one aspect of the present disclosure.

FIG. 4 shows a flow chart of a process 400 for encoding information bits according to various aspects of the present disclosure. At block 402, the process 400 divides information bits into first and second sets of information bits. The process 400 continues at block 404, in which the first set of information bits is encoded into a first set of coded bits and the second set of information bits is encoded into a second set of coded bits. For example, two (32, O) block code encoders that are standards-defined may be used to encode the information bits. Accordingly, two sets of 32 coded bits are generated. The process 400 continues at block 406, in which the first set of coded bits and the second set of coded bits are rate matched into a defined number of bits to generate a first set of rate-matched coded bits and a second set of rate-matched coded bits. The process 400 continues with block 408 in which the first and second sets of rate-matched coded bits are interleaved to generate an interleaved set of coded bits.

Figure 5:
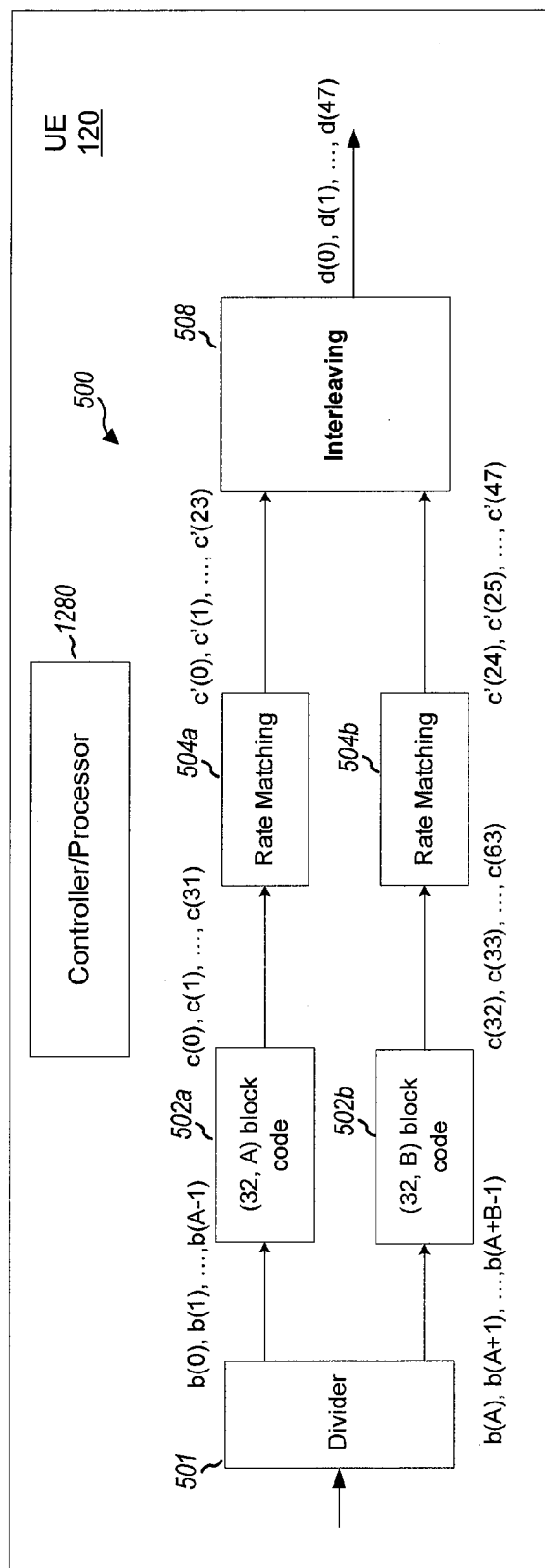
FIG. 5 is a block diagram conceptually illustrating an apparatus configured according to one aspect of the present disclosure.

FIG. 5 is a block diagram representation of a UE 120 configured according to one aspect of the present disclosure. UE 120 includes encoding process 500 for encoding uplink control information. A signal divider 501 divides input information bits into two sets for processing by the encoding process 500. The encoding process 500 operates within UE 120 using two (32, O) block code encoders 502a, 502b, where O denotes the number of input bits to the encoder. For example, A number of information bits b(0), b(1), b(A−1) of the first set are inputted to the encoder 502a, and B number of information bits b(A), b(A+1), b(A+B−1) of the second set are inputted to the encoder 502b. A and B may be the same or different. In one aspect, the (32, O) encoder 502a, 502b is a standards-defined encoder. The encoder 502a outputs 32 coded bits c(0), c(1), . . . , c(31) to a rate matching module 504a, and the encoder 502b outputs 32 coded bits c(32), c(33), . . . , c(63) to a rate matching module 504b.

The coded bits c(0), c(1), . . . , c(31) are rate matched to 24 bits c'(0), c'(1), . . . , c'(23), by the rate matching module 504a, and coded bits c(32), c(33), . . . , c(63) are rate mated to 24 bits c'(24), c'(25), . . . , c'(47), by the rate matching module 504b. The resulting rate-matched coded bits are input to an interleaver 508 that distributes coded bits c'(0), c'(1), . . . , c'(23) and coded bits c'(24), c'(25), . . . , c'(47) among the 48 interleaved-and-coded bits d(0), d(1), . . . , d(47). Accordingly, 24 of the final 48 coded bits may be transmitted in one time slot of a subframe, and the other 24 of the final 48 coded bits may be transmitted in a second time slot of the subframe. Thus, each information bit can enjoy diversity by way of slot-boundary frequency hopping.

In an aspect, the above techniques for channel coding may also be implemented for information transmitted in the PUSCH including, for example, control information such as HARQ-ACK information. Channel coding information for a HARQ-ACK is located in the 3GPP TS 36.212 technical specification, which is hereby incorporated by reference. Similar to FIG. 5 above, information bits may be divided into two sequences of bits which are each inputted to an encoder to generated two sets of coded bits. Each set of coded bits is rate matched to a determined number of bits to generate two individual rate-matched codeblocks. The individual rate-matched codeblocks may be interleaved by an interleaver. However, the interleaving may be performed at a modulation symbol level so as to generate a 'checker-board' or alternating pattern in the PUSCH. It should be noted the number of modulation symbols to be mapped may vary, for example, depending on the spectral efficiency of the PUSCH.

According to one aspect, modulation symbols may be mapped alternatively in a 'checker-board' or alternating pattern.

According to a second aspect, modulation symbols may be mapped as in the first embodiment, but modulation symbols may be divided approximately proportional to rate-matched code block input information bits $\lceil O^{ACK}/2 \rceil$ and $\lfloor O^{ACK}/2 \rfloor$, while keeping information bits from the two individual rate-matched codeblocks in separate QAM symbols.

According to a third aspect, modulation symbol-level interleaving may result in a 'checker-board' or alternating pattern.

Additional details regarding the example aspects for modulation on the PUSCH are described below in a text proposal (including pseudo code) for channel coding of more than 11 bits of HARQ-ACK information. Abbreviations are defined in the corresponding section 5.2.2.6 of TS 36.212, the entirety of which is hereby incorporated reference.

The HARQ-ACK bits input to the channel coding block are denoted by $O_0^{ACK}, O_1^{ACK}, \ldots, O_{O^{ACK}-1}^{ACK}$ where $11 < O^{ACK} \leq 20$ is the number of bits.

The sequences of bits $O_0^{ACK}, O_1^{ACK}, O_2^{ACK}, \ldots, O_{\lceil O^{ACK}/2 \rceil - 1}^{ACK}$ and $O_{\lceil O^{ACK}/2 \rceil}^{ACK}, O_{\lceil O^{ACK}/2 \rceil + 1}^{ACK}, O_{\lceil O^{ACK}/2 \rceil + 2}^{ACK}, \ldots, O_{O^{ACK}-1}^{ACK}$ are encoded as follows $$\tilde{q}_i = \sum_{n=0}^{\lceil o^{ACK}/2 \rceil - 1} (o_n^{ACK} \cdot M_{i,n}) \bmod 2$$

and $$\tilde{\tilde{q}} = \sum_{n=0}^{o^{ACK} - \lceil o^{ACK}/2 \rceil - 1} (o_{\lceil o^{ACK}/2 \rceil + n}^{ACK} \cdot M_{i,n}) \bmod 2$$

where i=0, 1, 2, . . . , 31 and the basis sequences $M_{i,n}$ are defined in Table 5.2.2.6.4-1 of TS 36.212.

The output bit sequence $q_0^{ACK}, q_1^{ACK}, q_2^{ACK}, \ldots, q_{Q_{ACK}-1}^{ACK}$ is obtained by the concatenation and circular repetition of the bit sequences $\tilde{q}_0, \tilde{q}_1, \tilde{q}_2, \ldots, \tilde{q}_{31}$ and $\tilde{\tilde{q}}_0, \tilde{\tilde{q}}_1, \tilde{\tilde{q}}_2, \ldots, \tilde{\tilde{q}}_{31}$ as follows First alternative aspect:

```
Set i = 0
while i < ⌊Q'/2⌋·Q_m
    q_{2i+⌊i/4⌋ mod 2}^{ACK} = q̃_{i mod 32}
    q_{2i+1−⌊i/4⌋ mod 2}^{ACK} = q̃̃_{i mod 32}
    i = i + 1
end while
Set i = 0
while i < (Q'−2⌊Q'/2⌋)·Q_m
    q_{2⌊Q'/2⌋·Q_m + i}^{ACK} = q̃_{(⌊Q'/2⌋·Q_m + i) mod 32}
    i = i + 1
end while
```

Second alternative aspect:

```
Set i = 0
while i < ⌊Q'·⌊O^{ACK}/2⌋/O^{ACK}⌋·Q_m
    q_{2i+⌊i/4⌋ mod 2}^{ACK} = q̃_{i mod 32}
    q_{2i+1−⌊i/4⌋ mod 2}^{ACK} = q̃̃_{i mod 32}
    i = i + 1
end while
Set i = 0
while i < (Q'−⌊Q'·⌊O^{ACK}/2⌋/O^{ACK}⌋)·Q_m
    q_{2⌊Q'·O^{ACK}/2⌋/O^{ACK}⌋·Q_m + i}^{ACK} = q̃_{(⌊Q'·O^{ACK}/2⌋/O^{ACK}⌋·Q_m + i) mod 32}
    i = i + 1
end while
```

Third alternative aspect:

```
Set k=0                      -- QAM symbol index
Set i_0=0, i_1=0, i=0
while k<Q'
    if ⌊k/4⌋ mod 2 = 0       -- even time index over 4 SC-FDM symbols
```

-continued

```
    if k mod 2 = 0
        set j=0
        while j < Q_m
```
$q_i = \tilde{q}_{i_0 \bmod 32}$
$j=j+1, i=i+1, i_0=i_0+1$
```
        end while
    else if k mod 2 = 1
        set j=0
        while j < Q_m
```
$q_i = \tilde{\tilde{q}}_{i_1 \bmod 32}$
$j=j+1, i=i+1, i_1=i_1+1$
```
        end while
    end if
else if ⌊k/4⌋ mod 2 = 1       -- odd time index over 4 SC-FDM symbols
    if k mod 2 = 0
        set j=0
        while j < Q_m
```
$q_i = \tilde{\tilde{q}}_{i_1 \bmod 32}$
$j=j+1, i=i+1, i_1=i_1+1$
```
        end while
    else if k mod 2 = 1
        set j=0
        while j < Q_m
```
$q_i = \tilde{q}_{i_0 \bmod 32}$
$j=j+1, i=i+1, i_0=i_0+1$
```
        end while
    end if
end if
k=k+1                         -- next modulation symbol
end while
```

Figure 6:
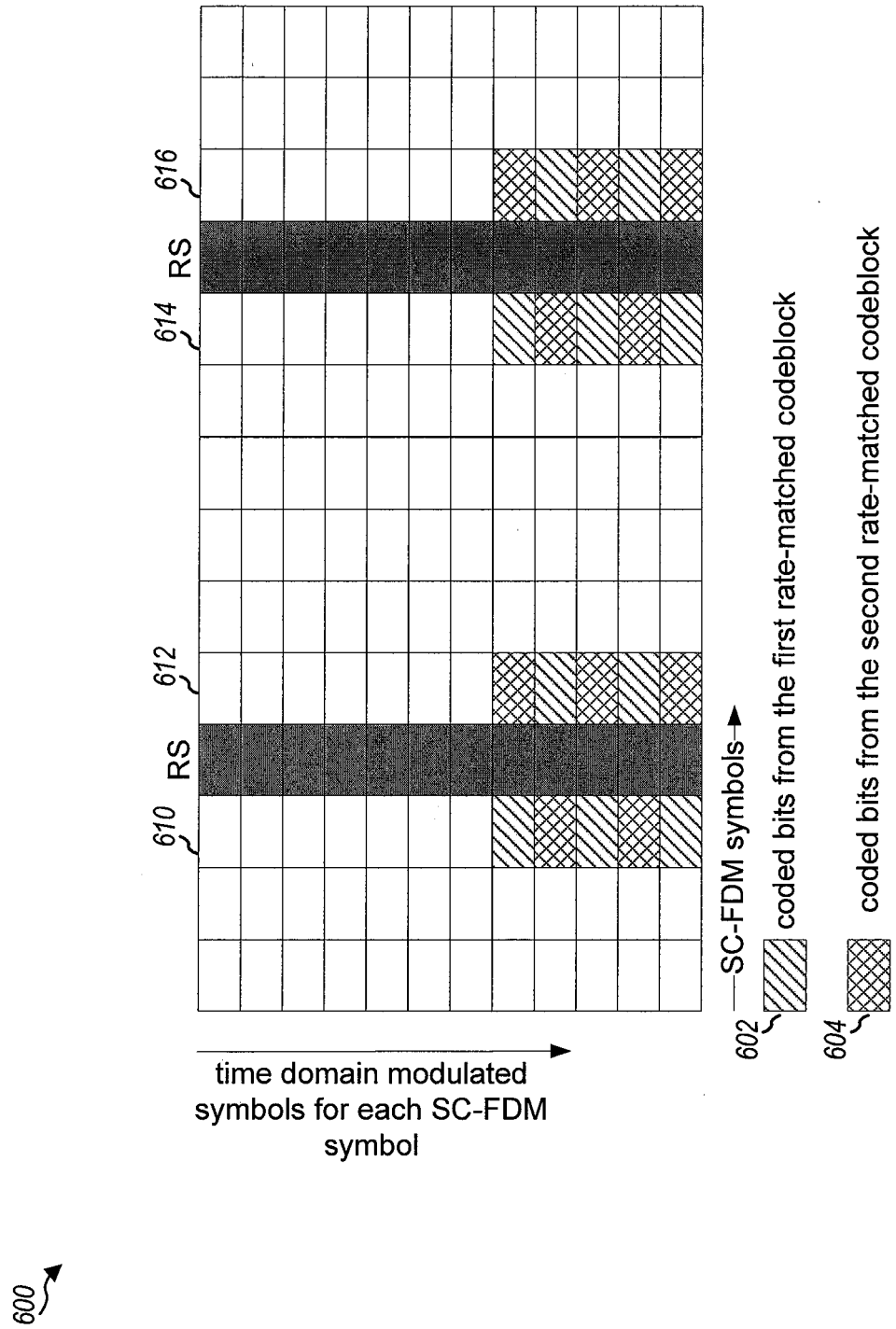
FIG. 6 is a diagram conceptually illustrating an example of a transmission of control information over an uplink shared data channel in a wireless communication system configured according to one aspect of the present disclosure.

FIG. 6 depicts an example transmission 600 over an uplink shared channel. The transmission 600 depicts SC-FDM symbols in the horizontal direction and time modulated symbols for each SC-FDM symbol in the vertical direction. A reference signal (RS) may be transmitted in two SC-FDM symbols as shown. The RS may be referred to as demodulation reference signal. In this example, Q'=20 (the total number of coded symbols for HARQ-ACK) and the number of coded bits $Q_m$ (e.g., 2, 4, 6, etc.) from the first and second rate-matched codeblocks may depend on the modulation order used. The transmission 600 illustrates that coded bits from the first rate-matched codeblock 602 and coded bits from the second rate-matched codeblock 604 are interleaved at a modulation symbol level and mapped in a 'checker-board' or alternating pattern. That is, in each SC-FDM symbol 610, 612, 614, 616 there is an alternating pattern of coded bits 602 from the first rate-matched codeblock and coded bits 604 from the second rate-matched codeblock. The alternating patterns in the even time index over 4 SC-FDM symbols may be the same, and the alternating patterns in the odd time index over 4 SC-FDM symbols may be the same.

The disclosure may be implemented in an apparatus such as user equipment (UE) or an e Node B (eNB) having one or more processors. Referring back to FIG. 5, the UE 120 includes controller/processor 1280 that executes operations and controls the components that provide the functionality and operation of UE 120. The controller/processor 1280 controls the signal divider 501 which provides the means for dividing a plurality of information bits into a first set of information bits and a second set of information bits. The controller/processor 1280 also controls block code encoders 502a and 502b to provide the means for encoding the first set of information bits into a first set of coded bits. UE 120 also includes rate matching modules 504a and 504b that provide the means for rate matching the first and second sets of coded bits into a defined number of bits generating first and second sets of rate-matched coded bits. The interleaver 508, controlled by controller/processor 1280, provides the means for interleaving the first and second set of rate-matched coded bits to generate an interleaved set of coded bits. Any or all of the processors, including controller/processor 1280, may be integrated into a single processor. The functions may alternatively be performed by digital or analog circuitry including devices such as digital signal processors (DSP) and application-specific integrated circuits (ASICs).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
dividing a plurality of information bits into a first set of information bits and a second set of information bits;
encoding the first set of information bits of the divided plurality of information bits into a first set of coded bits;
encoding the second set of information bits of the divided plurality of information bits into a second set of coded bits;
rate matching the first set of coded bits and the second set of coded bits to a defined number of bits to generate a first set of rate-matched coded bits and a second set of rate-matched coded bits;
interleaving the first set of rate-matched coded bits with the second set of rate-matched coded bits to generate an interleaved third set of coded bits; and
transmitting the interleaved third set of coded bits on a physical uplink channel, wherein the interleaving is based at least in part on the physical uplink channel.

2. The method of claim 1, in which the encoding the first set of information bits includes encoding the first set of information bits with a block code, and in which the encoding the second set of information bits includes encoding the second set of information bits with the block code.

3. The method of claim 2, in which the block code includes a (32, O) block code.

4. The method of claim 1, wherein the physical uplink channel is a physical uplink shared channel (PUSCH).

5. The method of claim 4, in which the defined number of bits for rate matching the first set of coded bits and the second set of coded bits includes a number based, at least in part, on a spectral efficiency of the PUSCH.

6. The method of claim 4, in which the interleaving includes concatenating the first set of rate-matched coded bits and the second set of rate-matched coded bits.

7. The method of claim 1, wherein the physical uplink channel is a physical uplink control channel (PUCCH).

8. The method of claim 7, in which the defined number of bits used for rate matching the first set of coded bits and the second set of coded bits is 48 bits.

9. The method of claim 7, in which the interleaving includes one of: bit-level interleaving and symbol-level interleaving.

10. The method of claim 1, further including providing the plurality of information bits corresponding to hybrid automatic repeat request (HARQ)-acknowledgement (ACK) information.

11. A computer program product comprising a non-transitory computer-readable storage medium with program code recorded thereon, the program code comprising:
program code to divide a plurality of information bits into a first set of information bits and a second set of information bits;
program code to encode the first set of information bits of the divided plurality of information bits into a first set of coded bits;
program code to encode the second set of information bits of the divided plurality of information bits into a second set of coded bits;
program code to rate match the first set of coded bits and the second set of coded bits to a defined number of bits;
program code to interleave the first set of coded bits with the second set of coded bits to generate an interleaved third set of coded bits; and
program code to transmit the interleaved third set of coded bits on a physical uplink channel, wherein the program code to interleave interleaves based at least in part on the physical uplink channel.

12. The computer program product of claim 11, in which the program code to encode the first set of information bits includes program code to encode the first set of information bits with a block code, and in which the program code to encode the second set of information bits includes program code to encode the second set of information bits with the block code.

13. The computer program product of claim 11, wherein the physical uplink channel is a physical uplink shared channel (PUSCH).

14. The computer program product of claim 13, in which the defined number of bits to be used to rate match the first set of coded bits and the second set of coded bits includes a number based, at least in part, on a spectral efficiency of the PUSCH.

15. The computer program product of claim 11, in which the program code to interleave includes one of: program code to bit-level interleave and program code to symbol-level interleave, and wherein the physical uplink channel is a physical uplink control channel (PUCCH).

16. An apparatus configured for wireless communication, comprising:
at least one processor coupled to a memory, in which the at least one processor is configured:
to divide a plurality of information bits into a first set of information bits and a second set of information bits;
to encode the first set of information bits of the divided plurality of information bits into a first set of coded bits;
to encode the second set of information bits of the divided plurality of information bits into a second set of coded bits;
to rate match the first set of coded bits and the second set of coded bits to a defined number of bits;
to interleave the first set of coded bits with the second set of coded bits to generate an interleaved third set of coded bits; and
to transmit the interleaved third set of coded bits on a physical uplink channel, wherein the at least one processor is configured to interleave based at least in part on the physical uplink channel.

17. The apparatus of claim 16, wherein the physical uplink channel is a physical uplink shared channel (PUSCH).

18. The apparatus of claim 17, in which the defined number of bits used to rate match the first set of coded bits and the second set of coded bits includes a number based, at least in part, on a spectral efficiency of the PUSCH.

19. The apparatus of claim 16, wherein the physical uplink channel is a physical uplink control channel (PUCCH).

20. The apparatus of claim 19, in which the at least one processor is further configured to one of: bit-level interleave and symbol-level interleave.

21. An apparatus for wireless communication, comprising:
means for dividing a plurality of information bits into a first set of information bits and a second set of information bits;
means for encoding the first set of information bits of the divided plurality of information bits into a first set of coded bits;
means for encoding the second set of information bits of the divided plurality of information bits into a second set of coded bits;
means for rate matching the first set of coded bits and the second set of coded bits to a defined number of bits to generate a first set of rate-matched coded bits and a second set of rate-matched coded bits;
means for interleaving the first set of rate-matched coded bits with the second set of rate-matched coded bits to generate an interleaved third set of coded bits; and
means for transmitting the interleaved third set of coded bits on a physical uplink channel, wherein the means for interleaving interleaves based at least in part on the physical uplink channel.

22. The apparatus of claim 21, in which the means for encoding the first set of information bits includes means for encoding the first set of information bits with a block code, and in which the means for encoding the second set of information bits includes means for encoding the second set of information bits with the block code.

23. The apparatus of claim 22, in which the block code includes a (32, O) block code.

24. The apparatus of claim 21, wherein the physical uplink channel is a physical uplink shared channel (PUSCH).

25. The apparatus of claim 24, in which the defined number of bits used for the means for rate matching the first set of coded bits and the second set of coded bits includes a number based, at least in part, on a spectral efficiency of the PUSCH.

26. The apparatus of claim 24, in which the means for interleaving includes means for concatenating the first set of rate-matched coded bits and the second set of rate-matched coded bits.

27. The apparatus of claim 21, wherein the physical uplink channel is a physical uplink control channel (PUCCH).

28. The apparatus of claim 27, in which the defined number of bits used for rate matching the first set of coded bits and the second set of coded bits is 48 bits.

29. The apparatus of claim 27, in which the means for interleaving includes one of: means for bit-level interleaving and means for symbol-level interleaving.

30. The apparatus of claim 21, further including means for providing the plurality of information bits corresponding to hybrid automatic repeat request (HARQ)-acknowledgement (ACK) information.

* * * * *